Patented July 3, 1951

2,559,574

UNITED STATES PATENT OFFICE 2,559,574

COMPOSITION AND METHOD FOR REMOVING OIL SLUDGE

Melvin Weissberg, Brooklyn, N. Y., assignor to Irving J. Rifkin and Alfred Turman No Drawing. Application June 3, 1948, Serial No. 30,992

4 Claims. (Cl. 252—353)

This invention relates to a composition particularly suitable for the dispersion of petroleum sludges and to a method for effecting such dispersion.

Sludges are common in the petroleum industry, as in petroleum storage tanks, fuel oil tanks, lines or burners, and the crank cases of internal combustion engines. A usual cause of sludge in fuel oil storage tanks, for instance, is breathing of the space above the oil in the tank with change of temperature and condensation of moisture. The condensed moisture in descending through the layer of oil in the tank becomes associated with suspended or difficultly soluble material, so that there collects in the bottom of the tank a mixture of various carbonaceous and siliceous impurities, asphaltic or resinous material, and water.

The dispersion of such sludges has received study over a long period of time. These studies have shown that various cleaning solvents are much alike in their action. For effective results under difficult circumstances, as in a low spot in a fuel oil supply system, there is required agitation of the sludge in contact with the solvents. Such agitation is frequently if not usually impossible.

I have now discovered one particular solvent mixture which makes the agitation unnecessary. In fact, the use of this oil results, in some unique manner, in self agitation of the sludge in contact with the mixture.

Briefly stated, the invention comprises a composition of matter including coal tar neutral oil and a surface active agent dissolved in the said oil, the surface active agent being one that is both oil-soluble and hydrophilic. The invention comprises also the method of dispersing petroleum sludges which includes contacting the surface of the sludge with a composition of the kind described.

The common understanding that the solvent oils for petroleum sludge act in about the same manner is easily disproven by demonstrations involving the use of conventional sludge removing solvents and the coal tar neutral oil of my invention, the same surface active agent, in the same proportion, being incorporated in advance with each of the solvents and the oil to be tested.

With blends of the surface active agent and conventional sludge removing oils, introducing a drop of the petroleum sludge into the said blends is followed by gradual diffusion of the sludge from surface portions into the solvent, all in accordance with expectations.

When, however, the blend is one of coal tar neutral oil and the same surface active agent as before and a drop of the sludge is caused to fall into this blend, the sludge becomes self agitating. It undergoes miniature eruptions. Streamers of the sludge are thrown out into the blend oil and surface active agent composition, as though the attraction were so strong that particles within the sludge, away from the surface of contact with the blend, are so impelled towards the blend that they cause miniature eruptions in the sludge material between the said particles and the surface of contact of the sludge with the cleaning blend.

This same self agitating effect may be seen with the microscope. A drop of the sludge is placed on the slide and a cover glass laid over the drop. Then a drop of the blend of coal tar neutral oil and surface active agent is placed on the slide, in contact with the edge of the cover glass. The whole is then observed under the microscope. As the blend gradually diffuses under the cover glass and approaches the drop of sludge, the particles of the sludge eventually jump across the space which separates the blend from the sludge, this jumping occurring just before actual contact of the surfaces of the blend and sludge.

The coal tar neutral oil which is the solvent base used in my composition and method has long been known. It is the neutral oil obtained in processing coal tar distillates. It contains no measurable acidity and is free from crystallization at winter temperatures. For success in my method and composition giving the effects described above, the coal tar neutral oil must be of specific gravity of at least about 1 at 15.5° C.

As the surface active agent, there is used one that is hydrophilic and soluble in both the coal tar neutral oil and like oils. Examples of satisfactory surface active agents meeting this general requirement are petroleum sulfonates, alkylene ether condensate of a fatty acid containing 10 to 22 carbon atoms to the molecule, as, for example, the condensation product of a polyglycol with a higher fatty acid such as the triethylene glycol condensate with oleic acid used in Example 3 below; triethanolamine oleate; and an alkylated aryl polyethoxy ethanol.

The surface active agent is used in proportions that are conventional with the particular surface active agent selected, as, for instance, 1–6.5 parts of refined petroleum sulfonate for 100 parts of the coal tar neutral oil and sulfonate.

The invention will be illustrated in greater detail by description in connection with the following specific examples.

Example 1

As the surface active agent there is used 3 parts by weight of refined petroleum sulfonate having an average molecular weight 500–525, containing 62% of actual sulfonate, 34% of mineral oil, and 0.4% of water, and distilling within the range 145° to 370° C. This agent is dissolved in 97 parts of coal tar neutral oil.

The composition so made is applied to the surface of the sludge left in the bottom of a fuel oil storage tank, either after or without draining away the fuel oil originally above the sludge.

The composition may be added to the tank without any draining, preferably just before a new supply of the oil is delivered to the tank.

Example 2

The procedure of Example 1 is followed, with an increase in the proportion of refined petroleum sulfonate to 5 parts by weight for 100 of combined weight of the coal tar neutral oils and petroleum sulfonate.

Example 3

The procedure of Examples 1 and 2 is followed with the exception that the surface active agent used is the condensate of triethylene glycol with oleic acid and the sludge which is dispersed is the sludge from the crank case of an internal combustion engine.

With the compositions of the kind described, application of them to the surfaces of the sludges to be dispersed is sufficient to cause rapid dispersion of the sludges without the need of externally induced agitation. As a result, slow pumping of the sludge removing composition, in the form of a coal tar neutral oil solution of the surface active agent, through a petroleum storage or fuel system is sufficient to cause dispersion of the remaining sludge in the composition.

Example 4

The procedures described above, and particularly the procedures described in Examples 1, 2, and 3, are repeated with the substitution of a synthetic aromatic neutral oil for the natural coal tar neutral oil, on an equal weight basis. For this purpose there is used an aromatic fraction derived from petroleum cracking and subsequent processing in accordance with known methods for producing such aromatic fraction from petroleum raw materials. Thus I may use a neutral aromatic petroleum liquid of specific gravity approximately 1 (actually 0.992 at 15.5° C.), boiling range 258° to 353° C., flash point 127° C., aromatic hydrocarbons content 95% by weight, and S. U. V. 37 sec. at 100° F. The synthetic oil is a mixture of alkylated naphthalene and other ring type compounds. Such material is made by repeated catalytic cracking of petroleum, followed by usual refining steps to give a neutral product of boiling range stated.

A product made with this synthetic aromatic neutral oil and containing the surface active agents of the kind and in proportion described shows great superiority in removing petroleum sludges over conventional sludge removing compositions heretofore used.

In use, the solution of the surface active agent in the aromatic neutral oil, either natural or synthetic, may be diluted with other organic solvent material, the kind of diluting solvent and the extent of the dilution being determined by the nature of the particular sludge to be removed.

It will be understood that it is intended to cover all changes and modifications of the examples of the invention herein chosen for the purpose of illustration which do not constitute departures from the spirit and scope of the invention.

What I claim is:

1. The method of dispersing petroleum sludge which comprises bringing the surface of the sludge into contact with a solution of a minor proportion of an oil-soluble and hydrophilic surface active agent in a solvent selected from the group consisting of coal tar neutral oil of specific gravity at least about 1 and an aromatic neutral hydrocarbon oil of specific gravity at least approximately 1 and of boiling range about 258° to 353° C., the surface active agent being selected from the group consisting of petroleum sulfonate, the condensate of triethylene glycol with oleic acid, and triethanolamine oleate.

2. The method of dispersing petroleum sludge which comprises bringing the surface of the sludge into contact with a solution of a minor proportion of an oil-soluble and hydrophilic petroleum sulfonate, as a surface active agent, in coal tar neutral oil of specific gravity at least about 1, the contact causing the sludge to undergo internal agitation and dispersion in the said solution.

3. A composition of matter suitable for use in dispersion of petroleum sludge comprising a solution of a minor proportion of an oil-soluble and hydrophilic surface active agent in a solvent selected from the group consisting of coal tar neutral oil of specific gravity at least about 1 and an aromatic neutral hydrocarbon oil of specific gravity at least approximately 1 and of boiling range about 258° to 353° C., the surface active agent being selected from the group consisting of petroleum sulfonate, the condensate of triethylene glycol with oleic acid, and triethanolamine oleate.

4. A composition of matter suitable for use in dispersion of petroleum sludge comprising coal tar neutral oil of specific gravity at least about 1 and a minor proportion of an oil-soluble and hydrophilic petroleum sulfonate dissolved in the coal tar neutral oil and serving as a surface active agent.

MELVIN WEISSBERG.

No references cited.